(12) United States Patent
Kent et al.

(10) Patent No.: US 7,643,839 B2
(45) Date of Patent: Jan. 5, 2010

(54) METHOD AND SYSTEM FOR DIVERSITY PROCESSING

(75) Inventors: Mark Kent, Vista, CA (US); Vinko Erceg, Cardiff, CA (US); Uri M. Landau, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 365 days.

(21) Appl. No.: 11/174,303

(22) Filed: Jun. 30, 2005

(65) Prior Publication Data

US 2006/0073797 A1 Apr. 6, 2006

Related U.S. Application Data

(60) Provisional application No. 60/616,779, filed on Oct. 6, 2004.

(51) Int. Cl.
*H04B 7/00* (2006.01)
*H04B 1/00* (2006.01)

(52) U.S. Cl. .................... 455/506; 455/65; 455/137

(58) Field of Classification Search ............ 455/101, 455/103, 132, 133, 137, 140, 506, 526, 63.1, 455/114.2, 130, 65; 375/267, 346, 347, 349
See application file for complete search history.

(56) References Cited

U.S. PATENT DOCUMENTS

| | | | | |
|---|---|---|---|---|
| 3,662,268 | A * | 5/1972 | Gans et al. | 455/504 |
| 5,926,503 | A * | 7/1999 | Kelton et al. | 375/148 |
| 6,128,276 | A | 10/2000 | Agee | |
| 6,128,355 | A * | 10/2000 | Backman et al. | 375/347 |
| 6,738,020 | B1 * | 5/2004 | Lindskog et al. | 342/377 |
| 6,754,253 | B2 * | 6/2004 | Guey | 375/148 |
| 7,010,070 | B2 * | 3/2006 | Li et al. | 375/349 |
| 7,039,369 | B2 * | 5/2006 | Horng | 455/101 |
| 7,151,951 | B2 * | 12/2006 | Goransson et al. | 455/562.1 |
| 7,218,682 | B2 * | 5/2007 | Mayor et al. | 375/299 |
| 7,269,238 | B2 * | 9/2007 | Lee et al. | 375/346 |

(Continued)

OTHER PUBLICATIONS

Jan Mietzner and Peter A. Hoeher, University of Kiel, Adaptive Antennas and MIMO Systems for Wireless Communications, Boosting the Performance of Wireless Communication Systems: Theory and Practice of Multiple-Antenna Techniques, IEEE Communications Magazine, Oct. 2004, pp. 40-47.

(Continued)

*Primary Examiner*—Sonny Trinh
(74) *Attorney, Agent, or Firm*—McAndrews, Held & Malloy (57) ABSTRACT

In an RF communication system, aspects for diversity processing may comprise processing a plurality of received multipath signals as clusters of signals. The received multipath signals may be diversity signals received from diversity transmit antennas at a base station. Timing information may be generated for tracking the clusters of signals. Complex phase and amplitude information may also be estimated for at least some of the multipath signals in the clusters of signals. At least a portion of the received multipath signals may be combined to form a single path processed diversity signal. A plurality of the single path processed diversity signals may be combined together, where each of the single path processed diversity signals may be derived from one of the plurality of diversity transmit antennas at the base station. The diversity signals may be transmitted via at least one of a plurality of diversity modes.

24 Claims, 7 Drawing Sheets

U.S. PATENT DOCUMENTS

| | | | |
|---|---|---|---|
| 7,471,694 B2 * | 12/2008 | Kent et al. | 370/464 |
| 7,483,675 B2 * | 1/2009 | Kent et al. | 455/67.11 |
| 7,505,539 B2 * | 3/2009 | Kent et al. | 375/347 |
| 7,522,562 B2 * | 4/2009 | Kent et al. | 370/334 |
| 2003/0031234 A1 | 2/2003 | Smee et al. | |
| 2003/0161390 A1 | 8/2003 | Teague et al. | |
| 2004/0131012 A1 * | 7/2004 | Mody et al. | 370/210 |
| 2004/0139466 A1 | 7/2004 | Sharma et al. | |
| 2005/0243898 A1 | 11/2005 | Reznik et al. | |
| 2007/0015545 A1 | 1/2007 | Leifer et al. | |

OTHER PUBLICATIONS

Simon Haykin, McMaster University; Mathini Sellathurai, Yvo De Jong, and Tricia Willink, Communications Research Centre Canada, Adaptive Antennas and MIMO Systems for Wireless Communications. Turbo-MIMO for Wireless Communications, IEEE Communications Magazine, Oct. 2004, pp. 48-53.

David J. Love, Purdue University, Robert W. Heath Jr., University of Texas at Austin and Wiroonsak Santipach and Michael L. Honig, Northwestern University; Adaptive Antennas and MIMO Systems for Wireless Communications, What is the Value of Limited Feedback for MIMO Channels?, IEEE Communications Magazine, Oct. 2004, pp. 54-59.

Quentin H. Spencer, Distribution Control Systems, Inc., Christian B. Peel, Swiss Federal Institute of Technology, A. Lee Swindlehurst, Brigham Young University, Martin Haardt. Ilmenau University of Technology, Adaptive Antennas and MIMO Systems for Wireless Communications, An Introduction to the Multi-User MIMO Downlink, IEEE Communications Magazine, Oct. 2004, pp. 60-67.

Shahab Sanayei and Aria Nosratinia, University of Texas at Dallas, Adaptive Antennas and MIMO Systems for Wireless Communications, Antenna Selection in MIMO Systems. IEEE Communications Magazine, Oct. 2004, pp. 68-73.

Aria Nosratinia, University of Texas, Dallas, Todd E. Hunter, Nortel Networks, Ahmadreza Hedayat, University of Texas, Dallas, Cooperative Communication in Wireless Networks, IEEE Communications Magazine, Oct. 2004. pp. 74-80.

* cited by examiner

METHOD AND SYSTEM FOR DIVERSITY PROCESSING

CROSS-REFERENCE TO RELATED APPLICATIONS/INCORPORATION BY REFERENCE

This patent application makes reference to, claims priority to, and claims the benefit from U.S. Provisional Patent Application Ser. No. 60/616,779 filed on Oct. 6, 2004.

The present application is related to the following applications, each of which is incorporated herein by reference in its entirety:

U.S. patent application Ser. No. 11/173,870 filed Jun. 30, 2005;

U.S. patent application Ser. No. 11/173,502 filed Jun. 30, 2005;

U.S. patent application Ser. No. 11/173,871 filed Jun. 30, 2005;

U.S. patent application Ser. No. 11/173,964 filed Jun. 30, 2005;

U.S. patent application Ser. No. 11/173,252 filed Jun. 30, 2005;

U.S. patent application Ser. No. 11/174,252 filed Jun. 30, 2005;

U.S. patent application Ser. No. 11/172,756 filed Jun. 30, 2005;

U.S. patent application Ser. No. 11/173,305 filed Jun. 30, 2005;

U.S. patent application Ser. No. 11/172,759 filed Jun. 30, 2005;

U.S. patent application Ser. No. 11/173,689 filed Jun. 30, 2005;

U.S. patent application Ser. No. 11/173,304 filed Jun. 30, 2005;

U.S. patent application Ser. No. 11/173,129 filed Jun. 30, 2005;

U.S. patent application Ser. No. 11/172,779 filed Jun. 30, 2005;

U.S. patent application Ser. No. 11/172,702 filed Jun. 30, 2005;

U.S. patent application Ser. No. 11/173,727 filed Jun. 30, 2005;

U.S. patent application Ser. No. 11/173,726 filed Jun. 30, 2005;

U.S. patent application Ser. No. 11/172,781 filed Jun. 30, 2005;

U.S. patent application Ser. No. 11/174,067 filed Jun. 30, 2005;

U.S. patent application Ser. No. 11/173,854 filed Jun. 30, 2005;

U.S. patent application Ser. No. 11/173,911 filed Jun. 30, 2005; and

U.S. patent application Ser. No. 11/174,403 filed Jun. 30, 2005.

FIELD OF THE INVENTION

Certain embodiments of the invention relate to communication receivers. More specifically, certain embodiments of the invention relate to a method and system for diversity processing.

BACKGROUND OF THE INVENTION

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

Figure 1A:
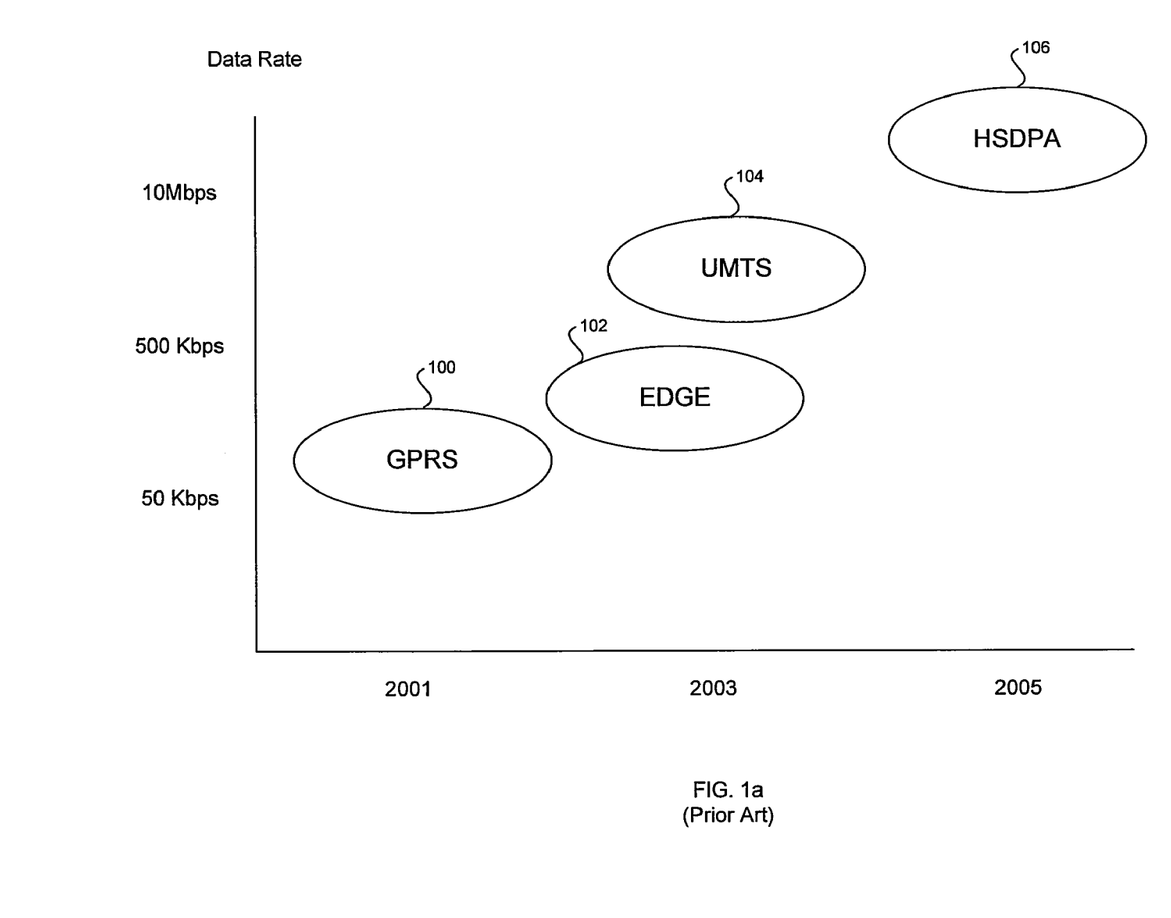
FIG. 1a is a technology timeline indicating evolution of existing WCDMA specification to provide increased downlink throughput.

FIG. 1a is a technology timeline indicating evolution of existing WCDMA specification to provide increased downlink throughput. Referring to FIG. 1a, there is shown data rate spaces occupied by various wireless technologies, including General Packet Radio Service (GPRS) 100, Enhanced Data rates for GSM (Global System for Mobile communications) Evolution (EDGE) 102, Universal Mobile Telecommunications System (UMTS) 104, and High Speed Downlink Packet Access (HSDPA) 106.

The GPRS and EDGE technologies may be utilized for enhancing the data throughput of present second generation (2G) systems such as GSM. The GSM technology may support data rates of up to 14.4 kilobits per second (Kbps), while the GPRS technology, introduced in 2001, may support data rates of up to 115 Kbps by allowing up to 8 data time slots per time division multiple access (TDMA) frame. The GSM technology, by contrast, may allow one data time slot per TDMA frame. The EDGE technology, introduced in 2003, may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The UMTS technology, introduced in 2003, with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The HSDPA technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology may also support 16-level quadrature amplitude modulation (16-QAM) over a high-speed downlink shared channel (HS-DSCH), which permits a plurality of users to share an air interface channel In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the WCDMA family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 Kbit/s to 1.8 Mbit/s with QPSK modulation, and 3.6 Mbit/s and up with 16-QAM modulation. The highest capability class supports the maximum theoretical bit rate of 14.4 Mbit/s.

However, implementing advanced wireless technologies such as WCDMA and/or HSDPA may still require overcoming some architectural hurdles. For example, the RAKE receiver is the most commonly used receiver in CDMA systems, mainly due to its simplicity and reasonable performance and WCDMA Release 99 networks are designed so that RAKE receivers may be used. A RAKE receiver contains a bank of spreading sequence correlators, each receiving an individual multipath. A RAKE receiver operates on multiple discrete paths. The received multipath signals can be combined in several ways, from which maximal ratio combining (MRC) is preferred in a coherent receiver. However, a RAKE receiver may be suboptimal in many practical systems, for example, its performance may degrade from multiple access interference (MAI), that is, interference induced by other users in the network.

In the case of a WCDMA downlink, MAI may result from inter-cell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intra-cell interference may be caused by multipath propagation. Due to the non-zero cross-correlation between spreading sequences with arbitrary time shifts, there is interference between propagation paths (or RAKE fingers) after despreading, causing MAI and inter-path interference (IPI). The level of intra-cell interference depends strongly on the channel response. In nearly flat fading channels, the physical channels remain almost completely orthogonal and intra-cell interference does not have any significant impact on the receiver performance. On the other hand, the performance of the RAKE receiver may be severely deteriorated by intra-cell interference in frequency selective channels. Frequency selectivity is common for the channels in WCDMA networks.

To combat MAI, linear interference suppression algorithms can be utilized, which are based on linear channel equalization and are suitable for WCDMA/HSDPA systems using long, orthogonal scrambling codes. Due to the difficulties faced when non-linear channel equalizers are applied to the WCDMA downlink, detection of the desired physical channel with a non-linear equalizer may result in implementing an interference canceller or optimal multi-user receiver. Both types of receivers may be prohibitively complex for mobile terminals and may require information not readily available at the mobile terminal. Alternatively, the total base station signal may be considered as the desired signal. However, non-linear equalizers rely on prior knowledge of the constellation of the desired signal, and this information is not readily available at the WCDMA terminal. The constellation of the total base station signal, that is, sum of all physical channels, is a high order quadrature amplitude modulation (QAM) constellation with uneven spacing. The spacing of the constellation changes constantly due to transmission power control (TPC) and possible power offsets between the control data fields, time-multiplexed to the dedicated physical channels. The constellation order may also frequently change due to discontinuous transmission. This makes an accurate estimation of the constellation very difficult.

In this regard, the use of multiple transmit and/or receive antennas may result in an improved overall system performance. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and array gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR).

However, the widespread deployment of multi-antenna systems in wireless communications, particularly in wireless handset devices, has been limited by the increased cost that results from increased size, complexity, and power consumption. The necessity of providing a separate RF chain for each transmit and receive antenna is a direct factor that increases the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase. This poses problems for mobile system designs and applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for diversity processing, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for diversity processing. Diversity processing may be utilized in instances where a transmitting base station transmits information via diversity transmission in which a plurality of transmit antennas is utilized. Diversity transmission may comprise a plurality of transmission modes that may be utilized to enhance data throughput. One embodiment of the invention may support at least one of the plurality of diversity transmission modes, and may process received multipath signals from the diversity transmit antennas as clusters of multipath signals. The diversity transmit modes may comprise closed loop 1 (CL1) mode, closed loop 2 (CL2) mode, and open loop mode (OL), as defined by the 3GPP specifications. The OL mode may be referred to as space-time transmit diversity (STTD) mode.

There may be three methods of optimizing the transmitted signal with respect to the receiving antenna for the closed loop modes CL1 and CL2. The first method may be referred to as a blind method. In this method, a feedback weight may be generated and sent to the transmitting base station by the receiving mobile terminal, and the same feedback weight may be used by the receiving mobile terminal to estimate the transmitted signal. The second method may be referred to as an antenna verification method. This method may use both dedicated pilot channel estimates and common pilot channel estimates to generate the feedback signal to the transmitting base station. An exemplary implementation is described in 3GPP TS 25.214 standards document. The third method may be referred to as a dedicated pilot method. In this method, the dedicated pilot channel estimates may be used to generate the feedback signal to the transmitting base station. In the closed loop modes, the same data may be transmitted by the transmitting antennas.

The STTD mode is an open loop mode, and, therefore, there is no feedback signal. The data, or symbols, transmitted by the transmitting antennas may be modulated by a space-time coding algorithm, and each antenna may transmit different data. Accordingly, the processing of the received signals by the receiving mobile terminal may be simplified since feedback weights need not be generated and only a space-time decoding algorithm may be required.

Figure 1B:
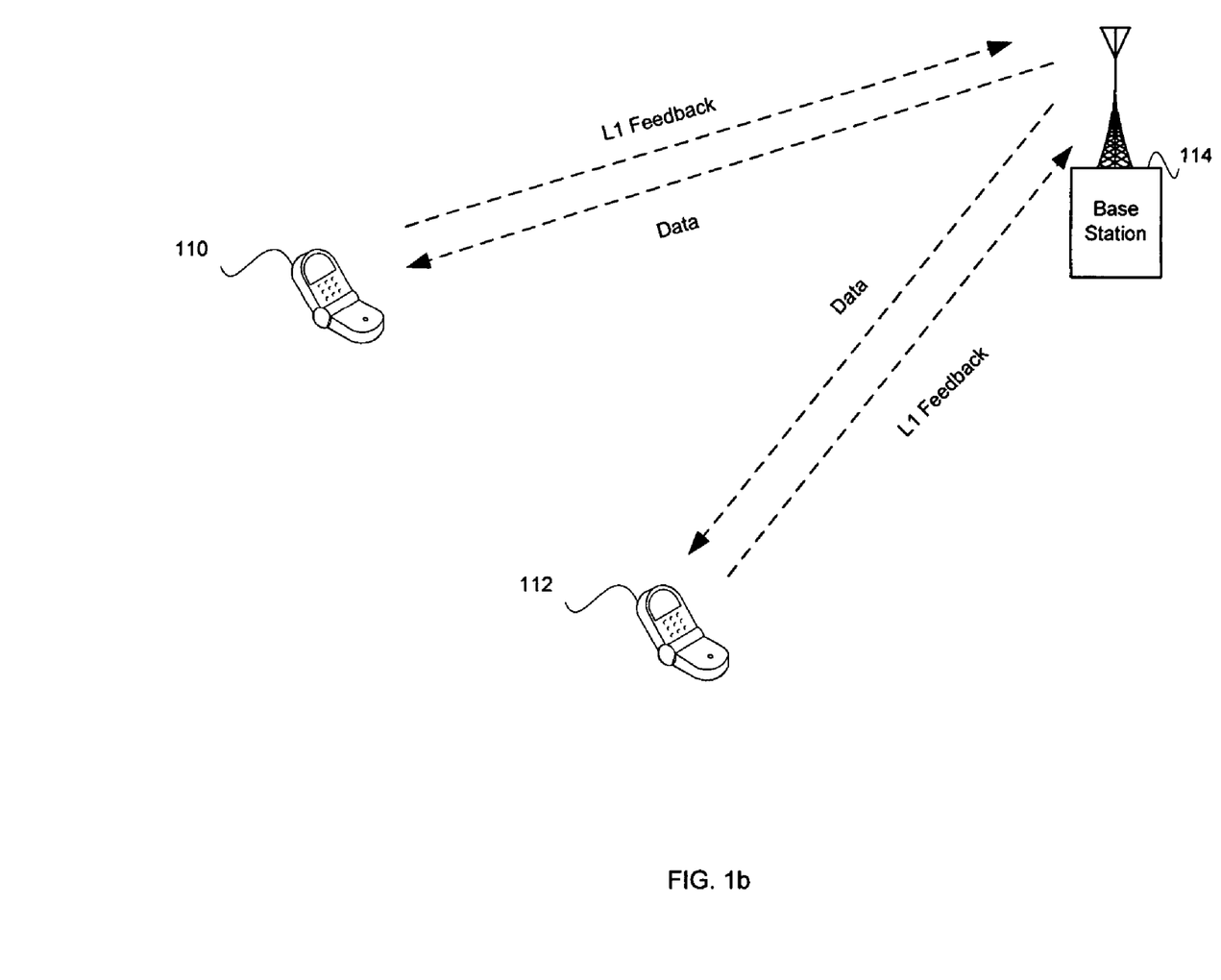
FIG. 1b illustrates an exemplary High Speed Downlink Packet Access (HSDPA) distributed architecture that achieves low delay link adaptation, in connection with an embodiment of the invention.

FIG. 1b illustrates an exemplary HSDPA distributed architecture that achieves low delay link adaptation, in connection with an embodiment of the invention. Referring to FIG. 1b, there is shown terminals 110 and 112 and a base station (BS) 114. HSDPA is built on a distributed architecture that achieves low delay link adaptation by placing key processing at the BS 114, which may be a medium access control (MAC), closer to the physical layer (PHY) air interface as illustrated. HSDPA leverages methods that are well established within existing GSM/EDGE standards, including fast physical layer (L1) retransmission combining and link adaptation techniques, to deliver significantly improved packet data throughput performance between the mobile terminals 110 and 112 and the BS 114.

The HSDPA technology employs several important new technological advances. Some of these may comprise scheduling for the downlink packet data operation at the BS 114, higher order modulation, adaptive modulation and coding, hybrid automatic repeat request (HARQ), physical layer feedback of the instantaneous channel condition, and a new transport channel type known as high-speed downlink shared channel (HS-DSCH) that allows several users to share the air interface channel. When deployed, HSDPA may co-exist on the same carrier as the current WCDMA and UMTS services, allowing operators to introduce greater capacity and higher data speeds into existing WCDMA networks. HSDPA replaces the basic features of WCDMA, such as variable spreading factor and fast power control, with adaptive modulation and coding, extensive multicode operation, and fast and spectrally efficient retransmission strategies.

In current-generation WCDMA networks, power control dynamics are on the order of 20 dB in the downlink and 70 dB in the uplink. WCDMA downlink power control dynamics are limited by potential interference between users on parallel code channels and by the nature of WCDMA base station implementations. For WCDMA users close to the base station, power control may not reduce power optimally, and reducing power beyond the 20 dB may therefore have only a marginal impact on capacity. HSDPA, for example, utilizes advanced link adaptation and adaptive modulation and coding (AMC) to ensure all users enjoy the highest possible data rate. AMC therefore adapts the modulation scheme and coding to the quality of the appropriate radio link.

Figure 1C:
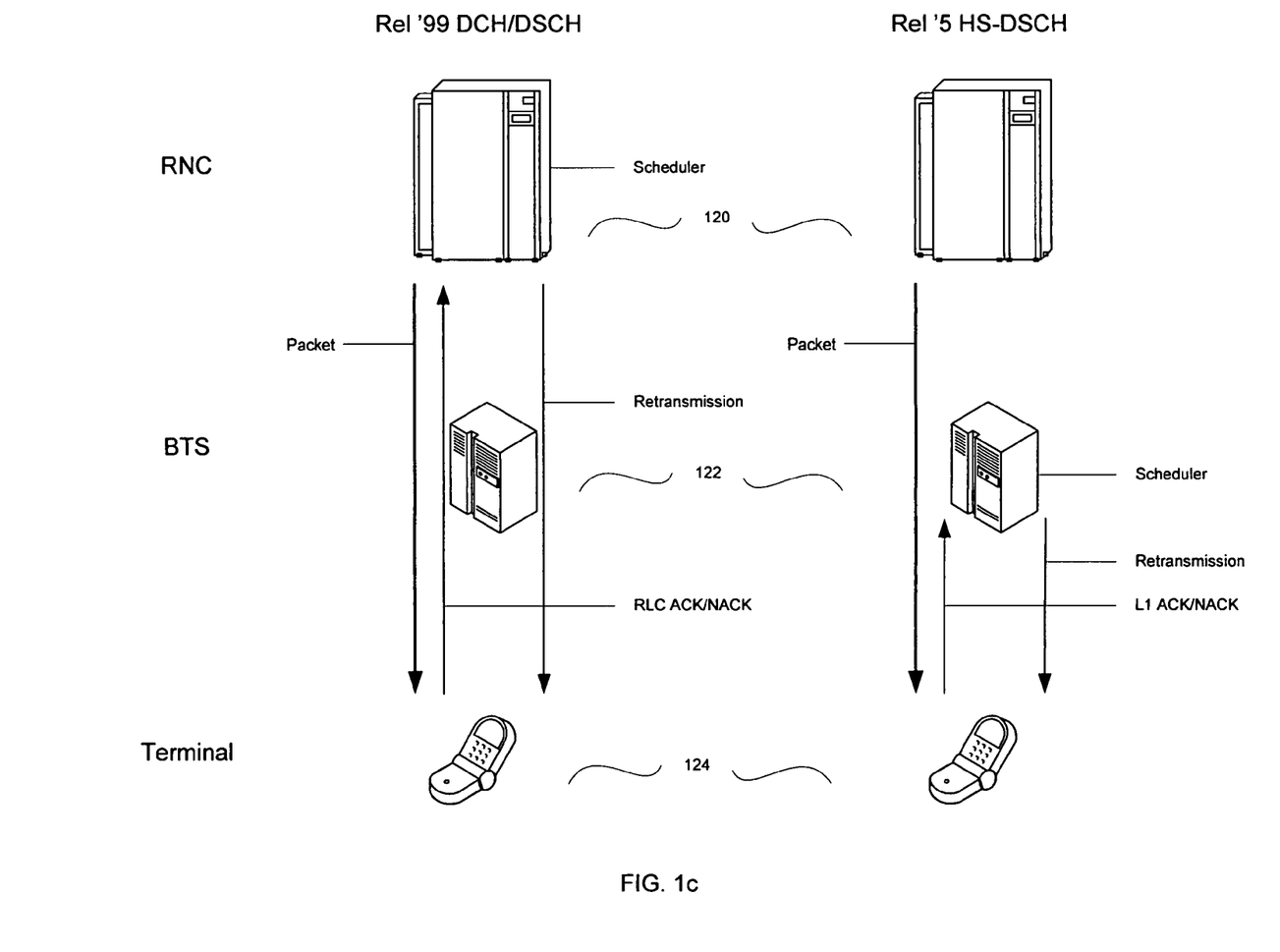
FIG. 1c illustrates an exemplary Layer 1 HARQ control situated in a base station to remove retransmission-related scheduling and storing from the radio network controller, in connection with an embodiment of the invention.

FIG. 1c illustrates an exemplary Layer 1 HARQ control situated in a base station to remove retransmission-related scheduling and storing from the radio network controller, in connection with an embodiment of the invention. Referring to FIG. 1c, there is shown a hybrid automatic repeat request (HARQ) operation, which is an operation designed to reduce the delay and increase the efficiency of retransmissions. Layer 1 HARQ control is situated in the Node B, or base station (BS) 122, thus removing retransmission-related scheduling and storing from the radio network controller (RNC) 120. This HARQ approach avoids hub delay and measurably reduces the resulting retransmission delay.

For example, when a link error occurs, due to signal interference or other causes, a mobile terminal 124 may request the retransmission of the data packets. While current-generation WCDMA networks handle those retransmission requests through the radio network controller 120, HSDPA retransmission requests are managed at the base station 122. Using this approach, packets are combined at the physical (PHY) layer and the mobile terminal 124 stores the received data packets in soft memory. If decoding has failed, the new transmission is combined with the old transmission before channel decoding. The HSDPA approach allows previously transmitted bits from the original transmission to be combined with the retransmission. This combining strategy provides improved decoding efficiencies and diversity gains while minimizing the need for additional repeat requests.

While the spreading factor may be fixed, the coding rate may vary between ¼ and ¾, and the HSDPA specification supports the use of five, 10 or 15 multicodes. More robust coding, fast HARQ, and multi-code operation eliminates the need for variable spreading factor and also allows for more advanced receiver structures in the mobile such as equalizers as apposed to the traditional RAKE receiver used in most CDMA systems. This approach may also allow users having good signal quality or higher coding rates and those at the more distant edge of the cell having lower coding rates to each receive an optimum available data rate.

By moving data traffic scheduling to the base station, and thus closer to the air interface, and by using information about channel quality, terminal capabilities, QoS, and power/code availability, HSDPA may achieve more efficient scheduling of data packet transmissions. Moving these intelligent network operations to the base station 122 allows the system to take full advantage of short-term variations, and thus to speed and simplify the critical transmission scheduling process. The HSDPA approach may, for example, manage scheduling to track the fast fading of the users and when conditions are favorable to allocate most of the cell capacity to a single user for a very short period of time. At the base station 122, HSDPA gathers and utilizes estimates of the channel quality of each active user. This feedback provides current information on a wide range of channel physical layer conditions, including power control, ACK/NACK ratio, QoS, and HSDPA-specific user feedback.

While WCDMA Release 99 or WCDMA Release 4 may support a downlink channel (DCH) or a downlink shared channel (DSCH), the HSDPA operation provided by WCDMA Release 5 may be carried on a high-speed downlink shared channel (HS-DSCH). This higher-speed approach uses a 2-ms frame length, compared to DSCH frame lengths of 10, 20, 40 or 80 ms. DSCH utilizes a variable spreading factor of 4 to 256 chips while HS-DSCH may utilize a fixed spreading factor of 16 with a maximum of 15 codes. HS-DSCH may supports 16-level quadrature amplitude modulation (16-QAM), link adaptation, and the combining of retransmissions at the physical layer with HARQ. HSDPA also leverages a high-speed shared control channel (HS-SCCH) to carry the required modulation and retransmission information. An uplink high-speed dedicated physical control channel (HS-DPCCH) carries ARQ acknowledgements, downlink quality feedback and other necessary control information on the uplink.

Figure 1D:
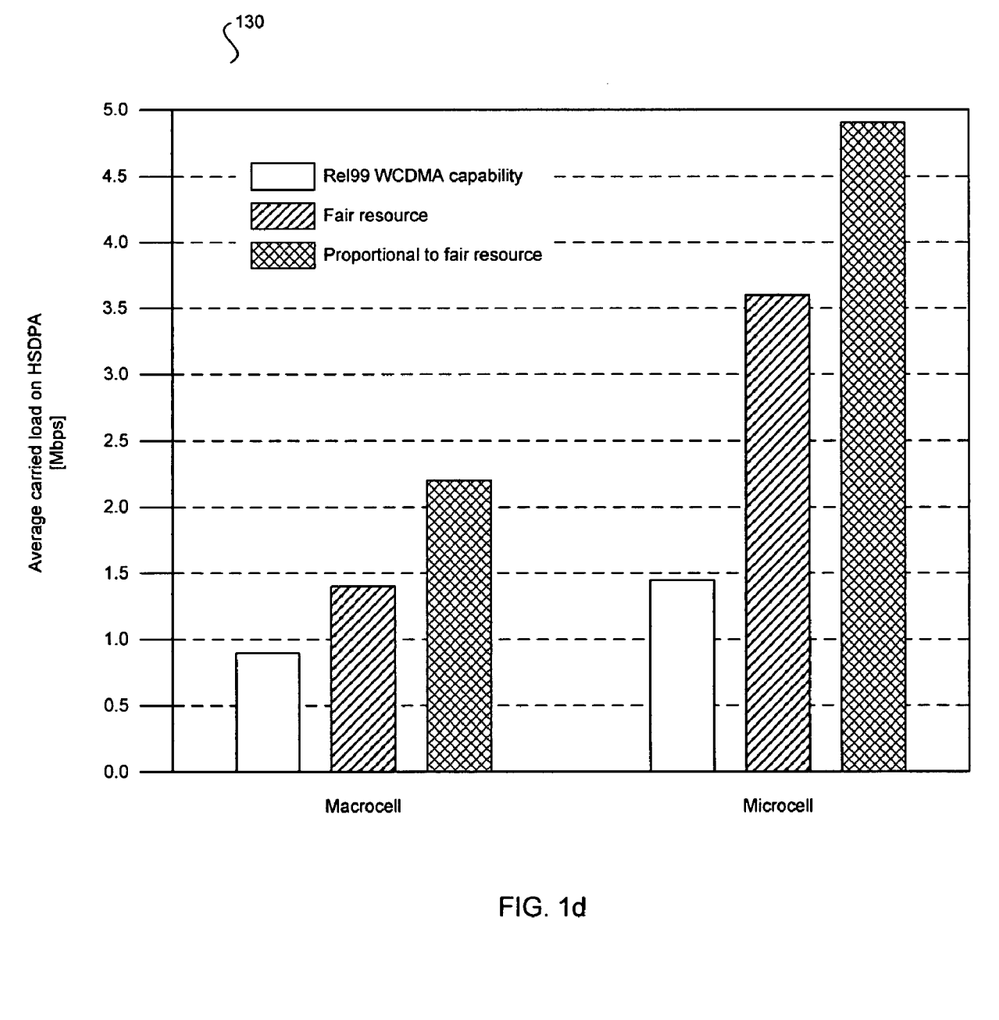
FIG. 1d is a chart illustrating exemplary average carried loads for HSDPA-based macrocell and microcell systems, in connection with an embodiment of the invention.

FIG. 1d is a chart illustrating exemplary average carried loads for HSDPA-based macrocell and microcell systems, in connection with an embodiment of the invention. Referring to chart 130 in FIG. 1d, in practical deployments, HSDPA more than doubles the achievable peak user bit rates compared to WCDMA Release 99. With bit rates that are comparable to DSL modem rates, HS-DSCH may deliver user bit rates in large macrocell environments exceeding 1 Mbit/s, and rates in small microcells up to 5 Mbit/s. The HSDPA approach supports both non-real-time UMTS QoS classes and real-time UMTS QoS classes with guaranteed bit rates.

Cell throughput, defined as the total number of bits per second transmitted to users through a single cell, increases 100% with HSDPA when compared to the WCDMA Release 99. This is because HSDPA's use of HARQ combines packet retransmission with the earlier transmission, and thus no transmissions are wasted. Higher order modulation schemes, such as 16-QAM, enable higher bit rates than QPSK-only modulation in WCDMA Release 99, even when the same orthogonal codes are used in both systems. The highest throughput may be obtained with low inter-path interference and low inter-cell interference conditions. In microcell designs, for example, the HS-DSCH may support up to 5 Mbit/s per sector per carrier, or 1 bit/s/Hz/cell.

Figure 2:
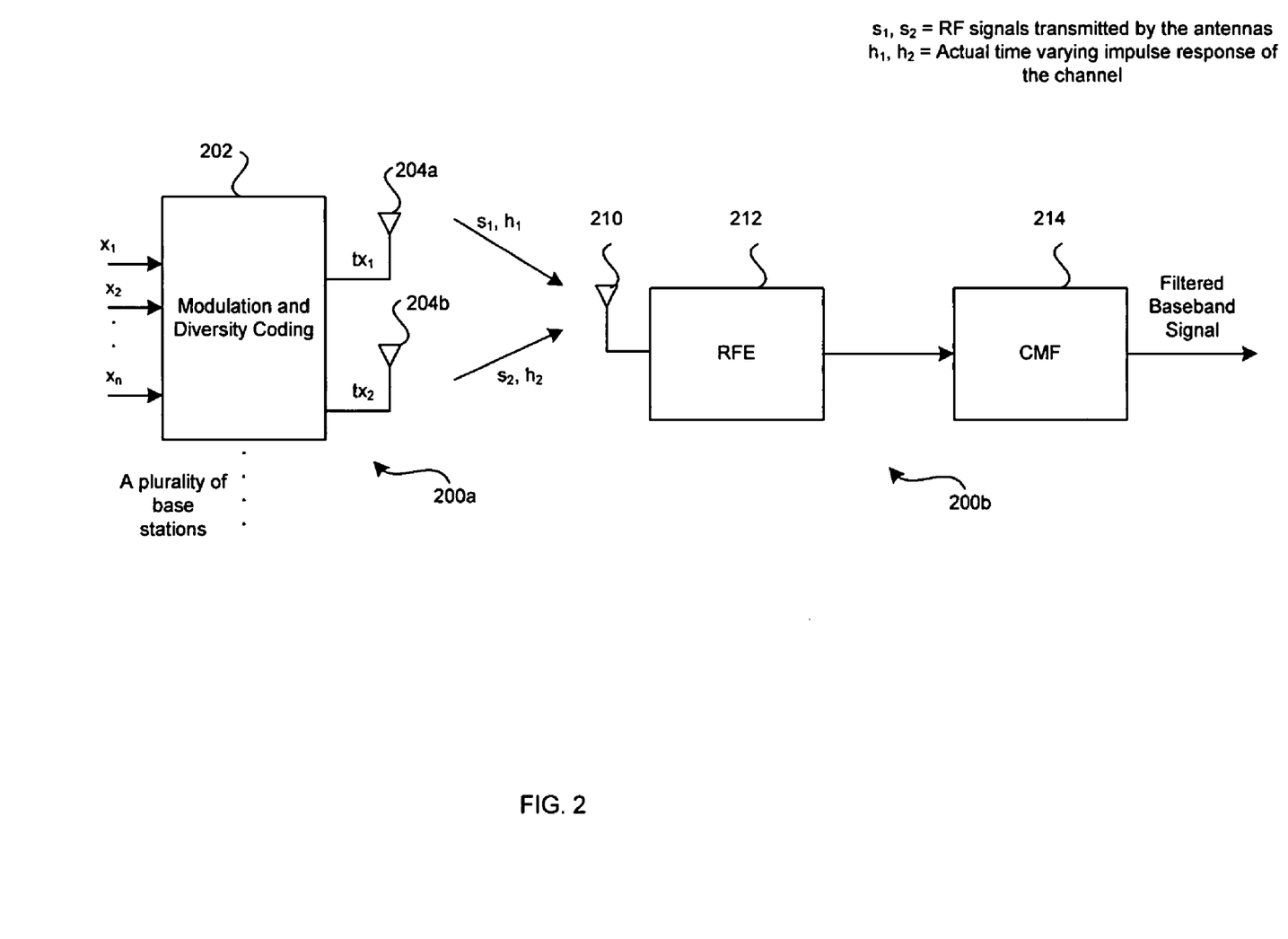
FIG. 2 is a block diagram illustrating exemplary receiver front end and chip matched filter, in accordance with an embodiment of the invention.

FIG. 2 is a block diagram illustrating exemplary receiver front end and chip matched filter, in accordance with an embodiment of the invention. Referring to FIG. 2, there is shown a transmitter section 200a, and a receiver section 200b. The transmitter section 200a may comprise a modulation and coding block 202 and a plurality of transmit antennas 204a and 204b. Data inputs $x_1, x_2, \ldots, x_n$, which may be referred to as symbols, may be inputs to the modulation and coding block 202. Signals $tx_1$ and $tx_2$ may be RF signals generated by the modulation and coding block 202 and communicated to the transmit antennas 204a and 204b, respectively. The receiver section 200b may comprise a receive antenna 210, a RFE block 212, and a channel matched filter (CMF) block 214.

On the transmit side 200a, the modulation and coding block 202 may be adapted to generate RF signals $tx_1$ and $tx_2$ from the data inputs $x_1, x_2, \ldots, x_n$, which may be referred to as symbols. The RF signals $tx_1$ and $tx_2$ may be transmitted via transmit antennas 204a and 204b, respectively. The RF signals transmitted via the transmit antennas 204a and 204b, for example, the RF signals $s_1$ and $s_2$, respectively, may be represented as propagating via channels having time varying impulse responses $h_1$ and $h_2$, respectively. The RF signals $s_1$ and $s_2$ may be the same signal or they may be different signals. For example, the RF signals s1 and s2 may comprise the same data in the CL1 and CL2 diversity modes or different data in the space-time transmit diversity (STTD) mode.

On the receive side 200b, the receive antenna 210 may comprise suitable logic, circuitry and/or code that may be adapted to receive RF signals, for example, the RF signals $s_1$ and $s_2$. The RFE block 212 may comprise suitable logic, circuitry and/or code that may be adapted to receive RF signals as input and convert these RF signals to digital baseband signals. After generating an analog baseband signal, the RFE block 212 may digitally sample the analog baseband signal at a pre-determined rate, and the resulting digital baseband signal may be an output of the RFE block 212. The CMF block 214 may comprise suitable logic, circuitry and/or code that may be adapted to digitally filter the WCDMA baseband bandwidth, and may be a pair of digital filters of the type Square Root Raised Cosine, as required by the WCDMA Standard body.

In operation, the modulation and coding block 202 may transmit RF signals via the transmit antennas 204a and 204b, and the receive antenna 210 may receive the RF signals, and may communicate the received RF signals to the RFE block 212. The RFE block 212 may process the received RF signals by filtering, amplifying, and/or down-converting the received RF signals to baseband signals. The baseband signal may be digitally sampled by an analog-to-digital converter at a determined sampling rate. The digitally sampled signal may be the output of the RFE block 212, and this signal may be communicated to the CMF block 214 where it may be digitally filtered. The filtered signals may be output by the CMF block 214 and communicated to a processor, for example, a cluster path processor that may process various multipath signals of RF signals transmitted by an antenna, for example, the transmit antenna 204a or 204b.

Figure 3:
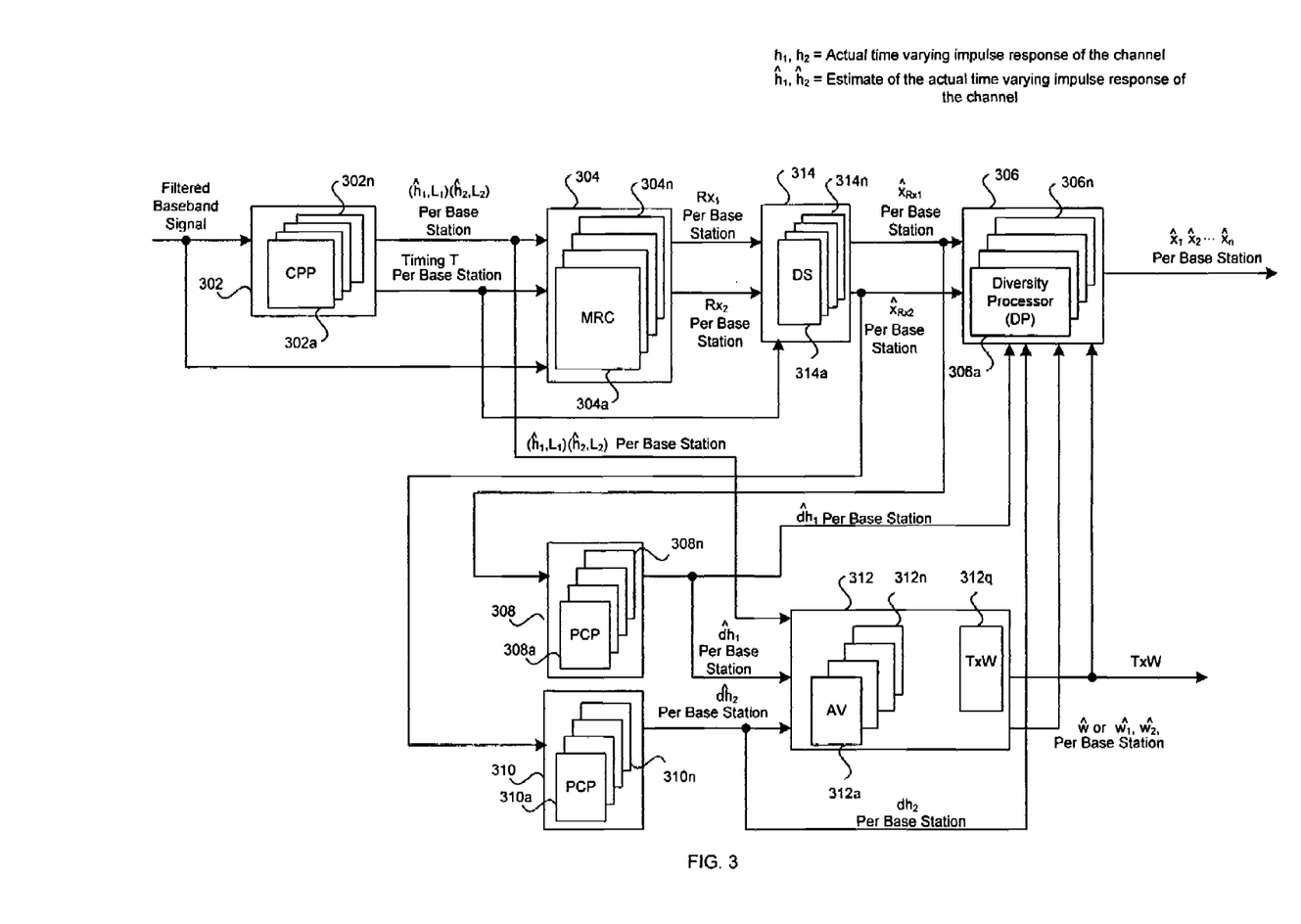
FIG. 3 is a block diagram illustrating symbol demodulation of diversity encoded transmission for WCDMA, in accordance with an embodiment of the invention.

FIG. 3 is a block diagram illustrating symbol demodulation of diversity encoded transmission for WCDMA, in accordance with an embodiment of the invention. Referring to FIG. 3, there is shown a cluster path processor (CPP) block 302, a maximum ratio combiner (MRC) block 304, a despreader (DS) block 314, a diversity processor (DP) block 306, dedicated pilot channel processor (PCP) blocks 308 and 310, and an antenna verifier (AV) block 312. The actual time varying impulse responses of the channels from the transmit antennas, for example, the transmit antennas 204a and 204b (FIG. 2), to the receive antenna, for example, the receive antenna 210 (FIG. 2), is represented by $h_1$ and $h_2$, respectively, per base station. The estimates of the actual time varying impulse responses of the channels $h_1$ and $h_2$ may be represented by $\hat{h}_1$ and $\hat{h}_2$, respectively, per base station.

The CPP block 302 may comprise a plurality of cluster path processors that may be adapted to receive and process an output of the CMF block 214 (FIG. 2). The CPPs 302a, ..., 302n within the CPP block 302 may be partitioned into pairs of CPPs, wherein each pair of CPPs may be adapted to track time-wise clusters of multipath signals and to estimate the complex phase and amplitude of the multipath signals in the signal clusters. The signal cluster may comprise an aggregate of received signals paths with maximum time difference that may be no more than $16/(3.84 \times 10^6)$ seconds. U.S. application Ser. No. 11/173,854 provides a detailed description of signal clusters and is hereby incorporated herein by reference in its entirety.

In one aspect of the invention, two CPPs may be utilized since the WCDMA standard facilitates a diversity transmitting mode in which the transmitted signal is transmitted over two antennas from each base station. The diversity transmit modes may comprise closed loop 1 (CL1) mode, closed loop 2 (CL2) mode, and open loop mode (OL) that may also be referred to as space-time transmit diversity (STTD) mode. The CPP block 302 may be adapted to determine channel estimates and lock indicators $(\hat{h}_1, L_1)$ and $(\hat{h}_2, L_2)$ per base station of the time varying impulse responses of the channels, for example, $h_1$ and $h_2$, and recover information transmitted over the channels on a per base station basis. The lock indicators $L_1$ and $L_2$ may provide an indication of which components in the corresponding estimates may comprise valid component values. An embodiment of the invention may use a strength of received signal to assert the lock indicators. However, in instances where there is only one transmitting antenna per base station, then only one CPP may be assigned per base station.

The maximum ratio combining (MRC) block 304 may comprise a plurality of MRCs, namely 304a, ..., 304n. Cluster timing and estimates of the time varying impulse response of the channel may be provided to the MRC block 304 on a per base station basis. The MRC block 304 may be adapted to provide a simplified and effective combining scheme or mechanism for implementing a RAKE receiver to combat noise fading, and to a certain degree, co-channel interference. In accordance with an embodiment of the invention, each of the MRCs 304a, ..., 304n may comprise suitable logic, circuitry and/or code that may be adapted to combine signals coherently and noise incoherently utilizing the maximum ratio combining algorithm. Each of the MRCs 304a, ..., 304n may be adapted to utilize the same proportionality constant for the channels. Other optimal combining algorithms such as, for example, minimum mean square error (MMSE) algorithm, may also be utilized. U.S. application Ser. No. 11/173,870 provides a detailed description of an MRC and is hereby incorporated herein by reference in its entirety.

The DS block 314 may comprise a plurality of DSs, namely 314a, ..., 314n. Each of the DSs 314a, ..., 314n may comprise suitable logic, circuitry, and/or code that may be adapted to despread received signals that may have been previously spread through the application of orthogonal spreading codes in the transmitter. Prior to transmission of an information signal, known as a "symbol", the transmitter may have applied an orthogonal spreading code that produced a signal comprising a plurality of chips. The DS block 314 may be adapted to generate local codes, for example Gold codes or orthogonal variable spreading factor (OVSF) codes, that may be applied to received signals through a method that may comprise multiplication and accumulation operations. Processing gain may be realized after completion of integration over a pre-determined number of chips in which the symbol is modulated.

Following despreading at the receiver, the original symbol may be extracted. WCDMA may support the simultaneous transmission of a plurality of spread spectrum signals in a single RF signal by utilizing spreading codes among the spread spectrum signals which are orthogonal to reduce multiple access interference (MAI). The receiver may extract an individual symbol from the transmitted plurality of spread spectrum signals by applying a despreading code, which may be equivalent to the code that was utilized for generating the spread spectrum signal. Similarly to the CPP block 302, and the MRC block 304, the DS block 314 may be assigned on a per base station basis, with the MRC block 304 communicating with the DS block 314 that may be assigned to the same base stations.

The DP block 306 may comprise a plurality of DPs, namely 306a, ..., 306n. In accordance with an embodiment of the invention, each of the DPs 306a, ..., 306n may comprise suitable logic, circuit and/or code that may be adapted to combine signals transmitted from multiple antennas in diversity modes. According to the 3GPP technical specification 25.211, version 6, the diversity modes may comprise open loop (OL), closed-loop 1 (CL1), and closed-loop 2 (CL2). Closed-loop techniques typically work better in slower changing propagation environments since it is easier to keep up with variations in the channel in these cases. In accordance with an embodiment of the invention, the diversity mode signals may be processed in a single hardware block requiring signal inputs from MRC block 304.

For the dedicated pilot channel method, the DP block 306 may receive dedicated pilot channel estimates from the PCP blocks 308 and 310. Additionally, the DP block 306 may receive a single weight per base station from the AV block 312 for the CL1 antenna verification method, and two weights per base station from the AV block 312 for the CL2 antenna verification method. For the blind method, the DP block 306 may receive the same feedback channel weight TxW as sent to the base station. The outputs of the DP block 306 may be generated on a per base station basis.

The PCP blocks 308 and 310 may comprise a plurality of PCPs, namely 308a, ..., 308n, and 310a, ..., 310n, respectively. In accordance with an embodiment of the invention, each of the PCPs 308a, ..., 308n, and 310a, ..., 310n may comprise suitable logic, circuit and/or code that may be adapted to provide coherent detection of and a phase reference for a transmit antenna by monitoring the dedicated pilot channels of the respective antennas. For example, a PCP in the PCP block 308 may provide coherent detection of and a phase reference for the transmit antenna 204a (FIG. 2), and a PCP in the PCP block 310 may provide coherent detection of and a phase reference for the transmit antenna 204b (FIG. 2). The outputs of the PCP blocks 308 and 310 may be per base station, and may be communicated to the AV block 312 and/or the DP block 306.

The dedicated control channel in WCDMA contains power control bits and rate information. The synchronization channel in WCDMA is used by the mobile stations to acquire initial time synchronization. One or more paging channels are used in WCDMA for paging the mobiles. In WCDMA, the common pilot channel provides a reference signal for coherent detection, cell acquisition, and handoffs. In addition to the common pilot channel, a dedicated pilot channel may be received by each mobile when operating on a dedicated channel. The dedicated pilot channel may be a time multiplexed channel providing information used for diversity operations in a WCDMA network.

The AV block 312 may comprise a plurality of AVs, namely 312a, ..., 312n, and a feedback channel weight generator (TxW) block 312q. In accordance with an embodiment of the invention, each of the AVs 312a, ..., 312n may comprise suitable logic, circuit and/or code that may be adapted to process dedicated pilot channel information from the PCP blocks 308 and 310 and common pilot channel estimate from the CPP block 302, and output an estimated channel weight $\hat{w}$ that may be used by the DP block 306. The feedback channel weight TxW sent to the base station may be utilized by the DP block 306 when the blind method is used. The feedback channel weight TxW may be calculated by the TxW block 312q using the channel estimates $\hat{h}_1$ and $\hat{h}_2$ for the two transmitting antennas in the CL1 and CL2 diversity modes.

The AVs 312a, ..., 312n may generate the estimated channel weight $\hat{w}$ that may be communicated to the DP block 306 for the antenna verification method. For the CL1 mode antenna verification method, the estimated channel weight $\hat{w}$ may comprise a single weight. For the CL2 mode antenna verification method, the estimated channel weight $\hat{w}$ may comprise two weights. The diversity mode CL1 typically has better performance when the mobile terminal is moving at relatively higher speeds with respect to the base station. For example, the diversity mode CL1 may be more applicable where the Doppler frequency shift due to the moving user equipment (UE) is greater than or equal to 60 Hz. The diversity mode CL2 may be more applicable when the Doppler frequency shift is less than 60 Hz.

In operation, a filtered baseband signal may be processed by pairs of CPPs in CPP block 302 so as to produce channel estimates $\hat{h}_1$ and $\hat{h}_2$, along with timing information T. The channel estimates $\hat{h}_1$ and $\hat{h}_2$ and the timing information T may be generated on a per base station basis. The channel estimates $\hat{h}_1$, $\hat{h}_2$ and the timing information T per base station may then be communicated to the MRC block 304, and the channel estimates $\hat{h}_1$, $\hat{h}_2$ may be communicated to the AV block 312, for processing. The timing information T per base station may also be communicated to the DS block 314. The MRC block 304 may be adapted to utilize the channel estimates $\hat{h}_1$, $\hat{h}_2$ and timing information T per base station, as well as the filtered baseband signal, to produce an estimated output signal. The estimated output signal may be communicated to the DS block 314.

The DS block 314 may be adapted to despread and generate output estimates on a per base station basis. The DS block 314 may utilize inputs communicated from the MRC block 304 and from the CPP block 302 to generate the output estimates. The output estimates from the DS block 314 may be communicated to the DP block 306, and to the PCP blocks 308 and 310. The DP block 306 may be adapted to provide diversity processing and generate output symbol estimates on a per base station basis. The DP block 306 may utilize inputs communicated from the DS block 314, from the PCP blocks 308 and 310, and from the AV block 312 to generate output symbol estimates. The output symbol estimates may be communicated to other processors, for example, a convolutional decoder or a turbo decoder where they may be further processed to extract voice or data information, respectively.

The PCP blocks 308 and 310 may process the estimated output from the DS block 314 to generate information specific to a transmitting antenna, for example, antennas 204a and 204b (FIG. 2), respectively, and this information may be communicated to the AV block 312 and/or to the DP block 306. The outputs of the PCP blocks 308 and 310 may be generated on a per base station basis. The AV block 312 may process the relevant antenna information in order to generate the estimated channel weight ŵ when the base station transmits utilizing the diversity modes CL1 and CL2. In addition, the feedback channel weight TxW may be calculated using the common pilot channel estimates for the two transmitting diversity antennas. The calculated feedback channel weight TxW may be transmitted to the base station, and may also be communicated to the DP block 306 in the case of the blind CL1 and CL2 methods.

Although two CPPs may be utilized per base station due to the present WCDMA standard, this should not be considered a limitation on the number of CPPs that may be assigned to a base station. Other implementations of the invention may assign a plurality of CPPs per base station as needed because of the number of transmitting antennas at the base station, or for some other reasons. Additionally, the cluster period of $16/(3.84 \times 10^6)$ seconds may be design and/or implementation dependent. Accordingly, the invention need not be limited to this cluster period.

Figure 4:
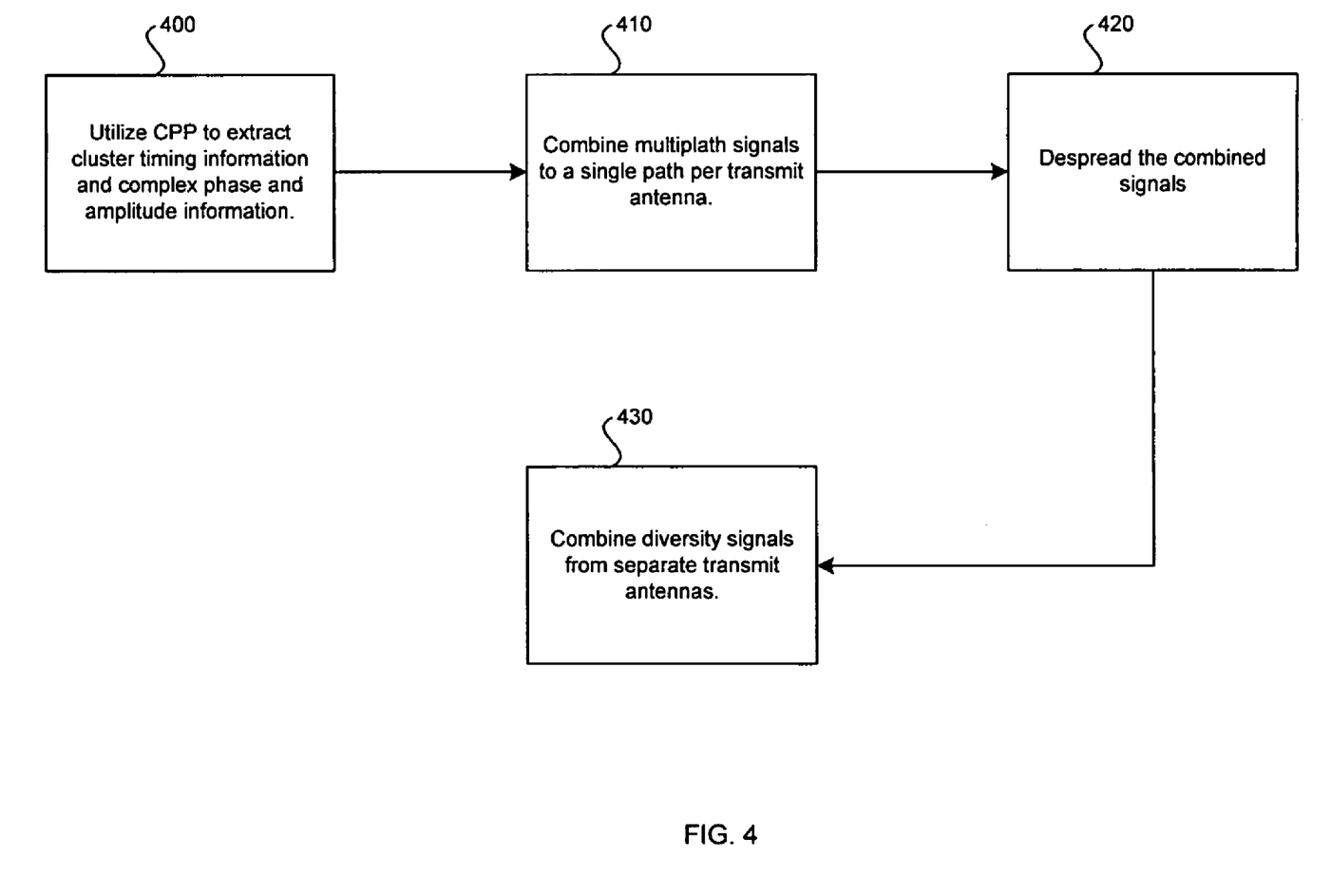
FIG. 4 is an exemplary flow diagram illustrating diversity processing, in accordance with an embodiment of the invention.

FIG. 4 is an exemplary flow diagram illustrating diversity processing, in accordance with an embodiment of the invention. Referring to FIG. 4, in step 400, the CPP may be utilized to generate timing information for the signal clusters and complex phase and amplitude information of the multipath signals in the signal clusters. In step 410, multipath signals of a single transmit antenna are combined to a single path. In step 420, the combined signals are despread. In step 430, diversity signals from diversity transmitting antennas utilizing CL1 mode, CL2 mode, or STTD mode are combined together.

Referring to FIG. 4, and with respect to FIGS. 2 and 3, the steps 400 to 430 may be utilized to process diversity signals. Diversity signals may be signals that are transmitted by more than one antenna, for example, the RF signals $s_1$ and $s_2$ transmitted by the diversity antennas 204a and 204b. The diversity signals may relate to the same information, but may be transmitted in a diversity configuration in order to attain stronger received signal. Since the diversity signals relate to the same information, part of a receive system that receives the transmitted diversity signals, for example, the circuitry illustrated in FIG. 3, may combine the diversity signals in order to recover the transmitted information.

In step 400, a CPP block 302 may be utilized to generate timing information for a signal cluster and complex phase and amplitude information for multipath signals in the signal clusters. At least one CPP may be assigned to track the received clusters from a base station. The CPP, or CPPs, assigned to track the clusters may generate timing information for each signal cluster and estimate complex phase and amplitude information for the multipath signals in the signal clusters.

In step 410, the MRC block 304 may receive the information regarding the multipath signals in the clusters, and the MRC block 304 may combine the various multipath signals of a single transmit antenna to a single signal. For example, the RF signal $s_1$ transmitted by the transmit antenna 204a may take a plurality of paths to the receive antenna 210. Portions of the RF signal $s_1$ may propagate directly to the receive antenna 210, while other portions may be reflected from obstacles such as a building and propagate to the receive antenna 210. Other portions may be reflected off the ground and propagate to the receive antenna 210. Since a signal transmitted by a transmit antenna may take a plurality of paths while propagating to the receive antenna, it is advantageous to have the capability to combine all of these signals in a coherent manner in order to be able to generate a stronger received signal.

In step 420, the DS block 314 may receive the recombined multipath signals from each transmit antenna, and may despread the signals from each antenna. Since the information that was transmitted from the base station to the user equipment may have been modulated to spread the signal, the signals may need to be despread in order to retrieve the information transmitted. In step 430, the DP 306 may receive the despread signals and may combine the despread signals. Data may have been separated in some manner and transmitted by a plurality of transmit antennas at the transmitting base station as diversity signals either to increase the data transfer rate and/or to increase the coherency of the received signal. Therefore, the diversity signals from the diversity transmitting antennas may need to be re-combined, either to retrieve the transmitted data and/or to increase the coherency of the signal.

Certain embodiments of the invention may be found in a method and system for diversity processing. Aspects of the method may comprise processing a plurality of received multipath signals as a plurality of clusters of signals. The plurality of received multipath signals may be diversity signals received from at least one of a plurality of diversity transmit antennas at a base station. The method may further comprise generating timing information that may be utilized for tracking at least a portion of the plurality of clusters of signals. Complex phase and amplitude information may also be estimated for at least a portion of the plurality of clusters of signals.

The method may further comprise providing coherent detection of and phase reference for at least one of the plurality of diversity transmit antennas by monitoring at least one common pilot channel of the plurality of diversity transmit antennas. At least a portion of the plurality of received multipath signals from one of the plurality of diversity transmit antennas may be combined to form a recombined diversity signal per antenna. The recombined diversity signal per antenna may be despread and the despread recombined diversity signals may be combined together to form a diversity processed output signal representing the original intended transmission. Each of the despread recombined diversity signals per antenna may be derived from one of the plurality of diversity transmit antennas at the base station.

The diversity signals may be combined together if the diversity signals are transmitted by the plurality of diversity transmit antennas at the base station via one of a plurality of diversity modes. The diversity modes may be the closed loop 1 (CL1) diversity mode, the closed loop 2 (CL2) diversity mode, and/or the open loop space-time transmit diversity (STTD) mode. A plurality of channel weights or channel weight information may be determined based on dedicated pilot channel estimates and/or common pilot channel estimates. The plurality of determined channel weight information may be communicated to the base station for closed loop 1 (CL1) diversity mode and for closed loop 2 (CL2) diversity mode.

Aspects of the system may comprise circuitry that processes a plurality of received multipath signals as a plurality of clusters of signals. The plurality of received multipath signals may be diversity signals received from at least one of a plurality of diversity transmit antennas at a base station. The system may further comprise at least one cluster path processor that generates timing information utilized to track at least a portion of the plurality of clusters of signals. The cluster path processor may estimate complex phase and amplitude information for at least a portion of the plurality of clusters of signals.

At least one common pilot channel processor that may provide coherent detection of and phase reference for at least one of the plurality of diversity transmit antennas. The common pilot channel processor may accomplish this by monitoring at least one common pilot channel of one of the plurality of diversity transmit antennas. At least one maximum ratio combiner that combines at least a portion of the plurality of received multipath signals from one of the plurality of diversity transmit antennas to form a recombined diversity signal. The recombined diversity signals may be despread by a despreader per recombined diversity signal. The despread recombined diversity signals may be combined together to form the diversity processed output signal representing the original intended transmission. Each of the despread recombined diversity signals may be derived from one of the plurality of diversity transmit antennas at the base station.

At least one diversity processor may combine a plurality of the despread recombined diversity signals. Each despread recombined diversity signal may be from one of the plurality of diversity transmit antennas at the base station. The system may further support diversity processing where the diversity signals may be transmitted via at least one of a plurality of diversity modes. The diversity modes may be the closed loop 1 (CL1) diversity mode, the closed loop 2 (CL2) diversity mode, and/or the open loop space-time transmit diversity (STTD) mode.

An antenna verifier may determine a plurality of channel weight information from dedicated pilot channel estimates and/or common pilot channel estimates. The system may comprise circuitry that may be adapted to communicate the plurality of determined channel weight information to the base station for closed loop 1 (CL1) diversity mode and for the closed loop 2 (CL2) diversity mode. The system may also utilize blind weights, without the antenna verifier, which may be the same as the weight sent to the base station.

By using the channel estimates from the CPP block 302 and the MRC block 304, the plurality of multipath signals may be combined to effectively arrive at a single path per transmit antenna. The DP 314 may perform STTD decoding and CL1 and CL2 diversity combining of these single paths per transmit antenna. Although an embodiment of the invention described with respect to FIG. 3 may show the DS block 314 as a separate block, the invention need not be so limited. For example, the DS block 314 and the MRC block 304 may be combined together. Similarly, various blocks shown may be combined together, or a block shown may be separated into a plurality of blocks.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing received signals, the method comprising:

receiving a plurality of multipath signals as a plurality of clusters of signals, wherein said plurality of received multipath signals are diversity signals received from at least one of a plurality of diversity transmit antennas at a base station;

combining at least a portion of said plurality of received multipath signals from one of said plurality of diversity transmit antennas to form a single path processed diversity signal;

despreading at least a portion of said single path processed diversity signal; and combining said despread at least a portion of said single path processed diversity signal with one or more subsequent despread diversity signals based on a plurality of computed channel weights, wherein each of said plurality of computed channel weights is based on received diversity mode CL1 information and/or received diversity mode CL2 information.

2. The method according to claim 1, comprising generating timing information utilized for tracking at least a portion of said plurality of clusters of signals.

3. The method according to claim 1, comprising estimating complex phase and amplitude information for at least a portion of said plurality of clusters of signals.

4. The method according to claim 1, comprising providing coherent detection of and phase reference for said at least one of said plurality of diversity transmit antennas by monitoring at least one common pilot channel of said at least one of said plurality of diversity transmit antennas.

5. The method according to claim 1, comprising combining a plurality of said despread said single path processed diversity signals, wherein each said despread said single path processed diversity signal is derived from one of said plurality of diversity transmit antennas at said base station.

6. The method according to claim 1, comprising combining said diversity signals transmitted by said plurality of diversity transmit antennas at said base station via at least one of a plurality of diversity modes.

7. The method according to claim 6, comprising determining a plurality of channel weight information from one or both of dedicated pilot channel estimates and common pilot channel estimates.

8. The method according to claim 7, comprising communicating said plurality of determined channel weight information to said base station for closed loop 1 diversity mode, wherein said closed loop 1 diversity mode is one of said plurality of diversity modes.

9. The method according to claim 7, comprising communicating said plurality of determined channel weight information to said base station for closed loop 2 diversity mode, wherein said closed loop 2 diversity mode is one of said plurality of diversity modes.

10. The method according to claim 6, wherein said plurality of diversity modes comprise an open loop space-time transmit diversity mode.

11. The method according to claim 1, comprising generating said each of said plurality of computed channel weights based on generated information specific to a distinct transmitting antenna.

12. The method according to claim 11, comprising generating said generated information specific to said distinct transmitting antenna based on coherent phase detection of a dedicated pilot channel corresponding to said distinct transmitting antenna.

13. A system for processing received signals, the system comprising:
one or more circuits that are operable to receive a plurality of multipath signals as a plurality of clusters of signals, wherein said plurality of received multipath signals are diversity signals received from at least one of a plurality of diversity transmit antennas at a base station;
said one or more circuits comprising at least one maximum ratio combiner are operable to combine at least a portion of said plurality of received multipath signals from one of said plurality of diversity transmit antennas to form a single path processed diversity signal;
said one or more circuits comprising at least one despreader are operable to despread at least a portion of said single path processed diversity signal; and
said one or more circuits are operable to combine said despread at least a portion of said single path processed diversity signal with one or more subsequent despread diversity signals based on a plurality of computed channel weights, wherein each of said plurality of computed channel weights is based on received diversity mode CL1 information and/or received diversity mode CL2 information.

14. The system according to claim 13, wherein said one or more circuits comprising at least one cluster path processor are operable to generate timing information utilized to track at least a portion of said plurality of clusters of signals.

15. The system according to claim 13, wherein said one or more circuits are operable to estimate complex phase and amplitude information for said at least a portion of said plurality of clusters of signals.

16. The system according to claim 13, wherein said one or more circuits comprising at least one common pilot channel processor are operable to provide coherent detection of and phase reference for said at least one of said plurality of diversity transmit antennas by monitoring at least one common pilot channel of said at least one of said plurality of diversity transmit antennas.

17. The system according to claim 13, wherein said one or more circuits comprising at least one diversity processor are operable to combine a plurality of said despread said single path processed diversity signals, wherein each said despread said single path processed diversity signal is derived from one of said plurality of diversity transmit antennas at said base station.

18. The system according to claim 13, wherein said one or more circuits are operable to combine said diversity signals transmitted by said plurality of diversity transmit antennas at said base station via at least one of a plurality of diversity modes.

19. The system according to claim 18, wherein said one or more circuits comprising an antenna verifier are operable to determine a plurality of channel weight information from one or both of dedicated pilot channel estimates and common pilot channel estimates.

20. The system according to claim 19, wherein said one or more circuits are operable to communicate said plurality of determined channel weight information to said base station for closed loop 1 diversity mode, wherein said closed loop 1 diversity mode is one of said plurality of diversity modes.

21. The system according to claim 19, wherein said one or more circuits are operable to communicate said plurality of determined channel weight information to said base station for closed loop 2 diversity mode, wherein said closed loop 2 diversity mode is one of said plurality of diversity modes.

22. The system according to claim 18, wherein said plurality of diversity modes comprise an open loop space-time transmit diversity mode.

23. The system according to claim 13, wherein said one or more circuits are operable to generate said each of said plurality of computed channel weights based on generated information specific to a distinct transmitting antenna.

24. The method according to claim 23, wherein said one or more circuits are operable to generate said generated information specific to said distinct transmitting antenna based on coherent phase detection of a dedicated pilot channel corresponding to said distinct transmitting antenna.

* * * * *